United States Patent
Birrer et al.

(10) Patent No.: US 6,649,896 B2
(45) Date of Patent: Nov. 18, 2003

(54) METHOD AND A DEVICE FOR MEASURING THE SPATIALLY AVERAGED INTENSITY OF A LIGHT BEAM AND A METHOD AND A DEVICE FOR REGULATING A LIGHT SOURCE

(75) Inventors: Lukas Birrer, Meggen (CH); Thomas Caratsch, Mettmenstetten (CH); Olivier Elsenhans, Mettmenstetten (CH); Emad Sarofim, Hagendom (CH); Urban Schnell, Müntschemier (CH)

(73) Assignee: Roche Molecular Systems, Inc., Alameda, CA (US)

( * ) Notice: Subject to any disclaimer, the term of this patent is extended or adjusted under 35 U.S.C. 154(b) by 0 days.

(21) Appl. No.: 10/168,790

(22) PCT Filed: Dec. 19, 2000

(86) PCT No.: PCT/EP00/12986
§ 371 (c)(1),
(2), (4) Date: Jun. 21, 2002

(87) PCT Pub. No.: WO01/48450
PCT Pub. Date: Jul. 5, 2001

(65) Prior Publication Data
US 2002/0190194 A1 Dec. 19, 2002

(30) Foreign Application Priority Data
Dec. 24, 1999 (EP) ............................................. 99811214

(51) Int. Cl.[7] ............................................... H01L 31/00
(52) U.S. Cl. .................... 250/205; 250/214.1
(58) Field of Search .......................... 250/205, 201.1, 250/214.1, 214 SG, 214 R; 315/149, 151, 180–183; 372/29.02, 29.021, 29.014, 29.01; 359/839

(56) References Cited

U.S. PATENT DOCUMENTS

| | | | |
|---|---|---|---|
| 4,049,963 A | | 9/1977 | Kuehnle |
| 4,060,426 A | | 11/1977 | Zinchuk |
| 5,489,771 A | | 2/1996 | Beach et al. |
| 5,753,903 A | * | 5/1998 | Mahaney ................ 250/205 |
| 5,939,704 A | | 8/1999 | Perrie et al. |
| 6,154,282 A | * | 11/2000 | Lilge et al. ............ 356/417 |
| 6,516,013 B1 | * | 2/2003 | Patzel et al. .......... 372/29.02 |

FOREIGN PATENT DOCUMENTS

| | | |
|---|---|---|
| EP | 0 125 390 A1 | 11/1984 |
| EP | 0 612 997 A2 | 8/1994 |
| FR | 2 277 436 | 1/1976 |

* cited by examiner

Primary Examiner—Kevin Pyo
Assistant Examiner—Seung C. Sohn
(74) Attorney, Agent, or Firm—Pennie & Edmonds, LLP

(57) ABSTRACT

A photoelectric module (1) comprises an electrically non-conducting support (2) and a photoelectric element including an array of spatially distributed photoelectric members applied to a surface of the support (2). High simplicity and efficiency is obtained by the double function of module (1) for light transmission or reflection, and spatially averaged light measurement. In a preferred application of module (1) a light source (8, LED) is energized by a driving circuit (9) controlled by an electronic circuit (11). The input of this circuit (11) is connected to the photoelectric module (1), the power delivered to the light source (8) and the intensity of the light beam emitted by the light source being regulated preferably to a constant value by the feedback loop consisting of module (1), electronic circuit (11) and driving circuit (9).

17 Claims, 7 Drawing Sheets

METHOD AND A DEVICE FOR MEASURING THE SPATIALLY AVERAGED INTENSITY OF A LIGHT BEAM AND A METHOD AND A DEVICE FOR REGULATING A LIGHT SOURCE

BACKGROUND OF THE INVENTION

1. Field of the Invention

A first aspect of the invention relates to a method and a device for measuring the intensity of a light beam provided by a light source.

2. Description of Related Art

A second aspect of the invention relates to a method and a device for regulating a light source.

In the following specification and claims, "light" means any electromagnetic radiation at least in the spectrum of visible light, infrared and ultraviolet. A somewhat similar device is known from U.S. Pat. No. 5,489,771. The light beam emerging from a light source passes through a diffuser block, and a small portion of light directed to a measuring photodiode at the side of the diffuser block forms the basis for measurement of the intensity of the light beam. However, it is not warranted that the portion of light directed to the measuring photodiode is really representative for the intensity of the whole light beam. Much light which is deflected to the side is lost. It is difficult to properly measure the output intensity of a light beam of which the wavelength is corrected. The prior measuring system comprises at least two separate constituents, namely the diffuser and the photodiode.

A first aim of the instant invention is to provide a method and a device which makes possible to avoid the above drawbacks and to provide a compact, inexpensive measuring device.

BRIEF SUMMARY OF THE INVENTION

The above mentioned first aim is addressed by a device for measuring a spatially averaged intensity of a light beam. This device comprises an electrically non-conducting support having a surface, and a photoelectric element. The photoelectric element comprises an array of spatially distributed photoelectric members that are electrically connected with each other. The array is applied to the surface of the support. Furthermore, the array of photoelectric members is adapted to receive and measure the intensity of a light beam directed towards the surface of the support. Each of the photoelectric members of the array has a surface adapted to receive, but not to transmit light. The surface of the support comprises a first set of areas and a second set of areas. Each of the first set of areas is covered by one of the photoelectric members and, therefore, does not allow light transmission. None of the second set of areas is covered by a photoelectric member and each of these areas allows light transmission. Each of the areas of the second set of areas is located between two or more of the areas of the first set of areas.

A method according to the invention for addressing the above mentioned first aim measures the spatially averaged intensity of a light beam provided by a light source. A photoelectric element is positioned into a light beam emerging from a light source. The photoelectric element comprises an array of spatially distributed photoelectric members which are applied to a surface of an electrically non-conducting support. The photoelectric members are electrically connected to one another. Each of the photoelectric members of the array has a surface adapted to receive, but not to transmit light. Also, the surface of the support comprises areas which allow light transmission. Each of these areas being located between at least two areas of the support surface which are covered by the photoelectric members. The intensity of the light beam provided by the light source is then measured by means of the photoelectric element.

In a first preferred embodiment of the invention, a light beam directly passes through a photoelectric module which serves at the same time in an optimum manner for transmission and measurement of the light beam. For this purpose the latter photoelectric module comprises an at least partially transparent support and a photoelectric element applied to, laid over or disposed on a surface of that support, which photoelectric element comprises at least one member, and preferably an array of photoelectric members, which is/are spatially distributed over the surface of the support and over the cross section of the light beam respectively. When a light beam passes through the above mentioned photoelectric module, the above mentioned photoelectric element properly measures the averaged power or intensity of the light beam. The transparent or semi-transparent support may directly serve as a beam-shaping element, wavelength filter, polarizer, or a combination thereof. The photoelectric element properly measures the intensity of the modified light emerging from the photoelectric module. The expression "light beam passes through the photoelectric element" means that light passes through the support, on a surface of which the photoelectric element is disposed, and between the above mentioned, spatially distributed members of the photoelectric element. Due to the double function mentioned above of a device according to the invention built as a unitary module, this module is simple and compact and may easily be assembled with other parts of any other suitable device. The design allows a high flexibility of the shape of the spatially distributed photoelectric element, which is e.g. a grid-shaped photoelectric element, the grid-shape having a suitable pattern. Multiple uses of a device according to the invention are therefore possible.

As pointed out at the outset a second aspect of the invention relates to a method and a device for regulating a light source. A device of this kind is known for instance from U.S. Pat. No. 4,998,043. In this prior device the light beam from a light emitting diode (LED) is split up in a beam splitter and the partial beam thereby split off is directed to a photodiode PD. The measuring signal produced by means of the photodiode is fed back to a comparator serving as a control or regulating circuit of which the output controls a drive circuit for regulating the power fed to the LED in order to keep the light emission by this LED at a constant level. Such a regulating system is of particular importance when a LED is used as a light source since the characteristics of LEDs are known to be subject to high lot-to-lot variations, aging effects, low temperature stability of the spectral properties and of the light intensity and low homogeneity of the spatial spectrum. The prior device mentioned above is quite complicated due to the use of a beam splitter in a fiber optics system, and simple compact and inexpensive integration thereof is not warranted.

A second aim of the instant invention is therefore to provide a method and a device for measuring the spatially averaged intensity of a light beam by means of compact and low-cost means, without fiber optics and with high luminous efficiency.

This above mentioned second aim is addressed with a device for regulating the intensity of a light beam provided by a light source. The device comprises a photoelectric element by means of which the intensity of the light beam is measured, and a driving circuit for regulating the output power of the light source by feedback of a measuring signal provided by the photoelectric element to the driving circuit. The device is characterized in that the photoelectric element is located in the path of the light beam provided by the light source and the photoelectric element comprises an array of spatially distributed photoelectric members. The array of spatially distributed photoelectric members is applied to a surface of an electrically non-conducting support and is electrically connected to one another. Each of the photoelectric members of the array has a surface adapted to receive, but not to transmit light. The surface of the support comprises areas that allow light transmission, each of the latter areas being located between at least two areas of the support surface that are covered by the photoelectric members.

A method according to the invention for addressing the above mentioned second aim regulates a light source. The intensity of the light beam provided by the light source is measured by means of a photoelectric element located in the path of the light beam provided by the light source in order to generate a measuring signal representative of the intensity. The photoelectric element comprises an array of spatially distributed photoelectric members which are applied to a surface of an electrically non-conducting support and which are electrically connected to one another. Each of the photoelectric members of the array has a surface adapted to receive, but not to transmit light. The surface of the support comprises areas which allow light transmission, each of the latter areas being located between at least two areas of the support surface which are covered by the photoelectric members. The intensity of the light beam provided by the light source is regulated by means of a driving circuit. This regulating step includes feedback of the measuring signal provided by the photoelectric element to the driving circuit.

BRIEF DESCRIPTION OF THE SEVERAL VIEWS OF THE DRAWINGS

Examples of preferred embodiments of the invention are described hereinafter in more detail with reference to the accompanying drawings wherein.

DETAILED DESCRIPTION OF THE INVENTION

Figure 1:
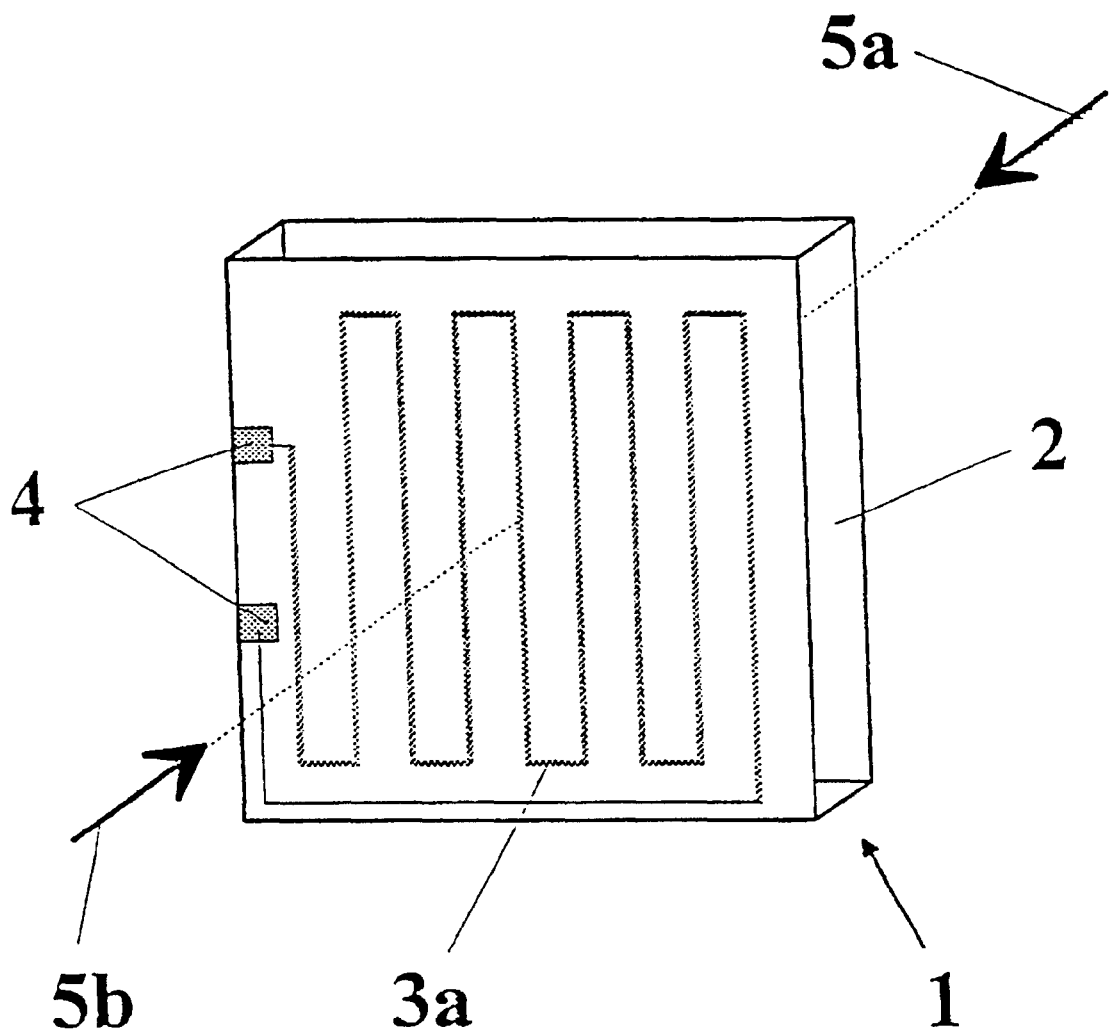
FIGS. 1 to 5 show embodiments of the photoelectric measuring module 1 according to the invention.

FIG. 1 shows a first embodiment of a photoelectric measuring module 1 comprising a glass substrate 2 which is electrically non-conducting and serves as a support for a photoelectric element or transducer 3a. This transducer is preferably a photodiode which comprises an array of photoelectric members arranged in a spatially distributed pattern, e.g. a meander or zigzag pattern, the latter members being electrically connected with each other.

The array of photoelectric members of photoelectric transducer 3a is adapted to receive and measure the intensity of a light beam directed towards that surface of support 2.

Each of the photoelectric members of photoelectric transducer 3a has a surface adapted to receive, but not to transmit light.

The surface of support 2 on which the array of photoelectric members of photoelectric transducer 3a is disposed comprises a first set of areas each of which is covered by one of the photoelectric members and which thereby does not allow light transmission, and a second set of areas none of which is covered by any one of the photoelectric members and each of which allows light transmission, each of the areas of the second set of areas being located between two or more of the areas of the first set of areas.

The above described properties of transducer 3a and support 2 also apply to the other embodiments of a device according to the invention described hereinafter.

Photoelectric transducer 3a is applied to support 2 by any suitable process available for applying elements like this to such a support. Any suitable substrate for light transmission and any suitable photoelectric transducer may be used, such as any passive element, e.g. a photoresistive element, or any suitable active element, e.g. a photovoltaic element, which is apt to produce a voltage or current having a value which depends from the measured light intensity.

In a first preferred embodiment of a device according to the invention substrate 2 is transparent or semitransparent and the photoelectric element is applied to or mounted on a surface of substrate 2 which is located in the path of the light beam provided by the light source.

As will be clear from FIG. 1, the element 3a is applied to or mounted on the support 2 in spatially substantially constant or regular distribution in order to measure the full cross section of the light beam passing therethrough. Element 3a has two electrical connecting points which are spaced from each other. These connecting points are for instance bonding pads 4. The direction or optical axis of a light beam passing through the photoelectric measuring module 1 is indicated by arrow 5a or arrow 5b depending from the side of support 2 on which the light source is located.

Figure 2:
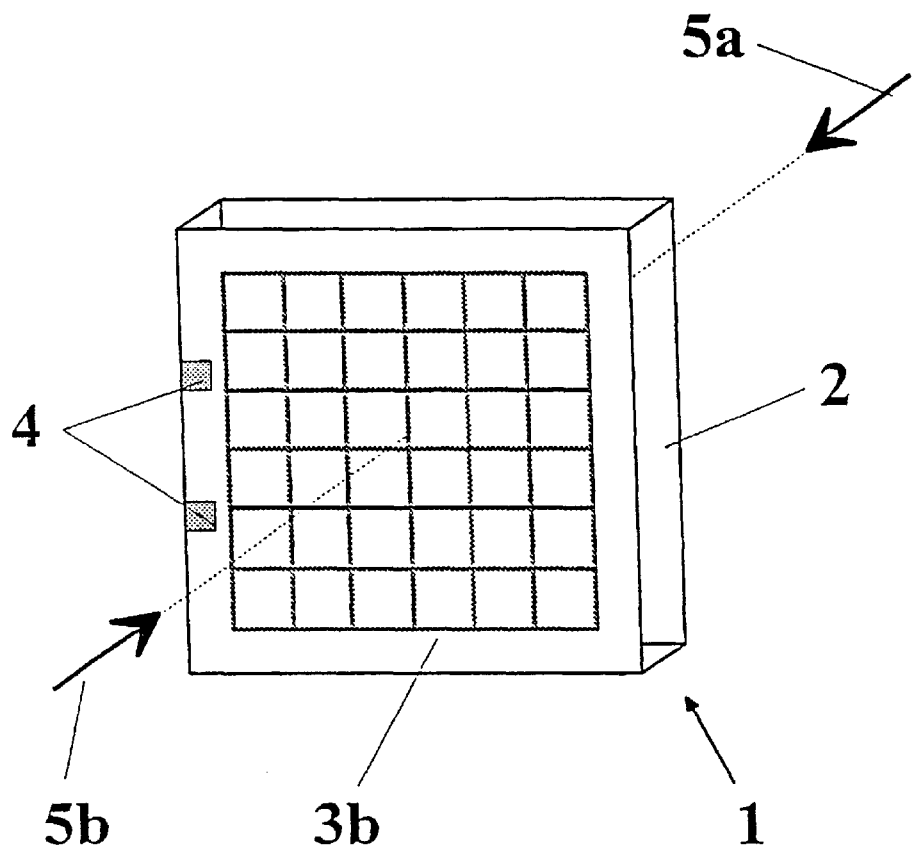

In FIG. 2 corresponding parts are designated by the same reference numerals as in FIG. 1. The photoelectric element 3b of this embodiment is a grid of orthogonal strips.

Figure 3:
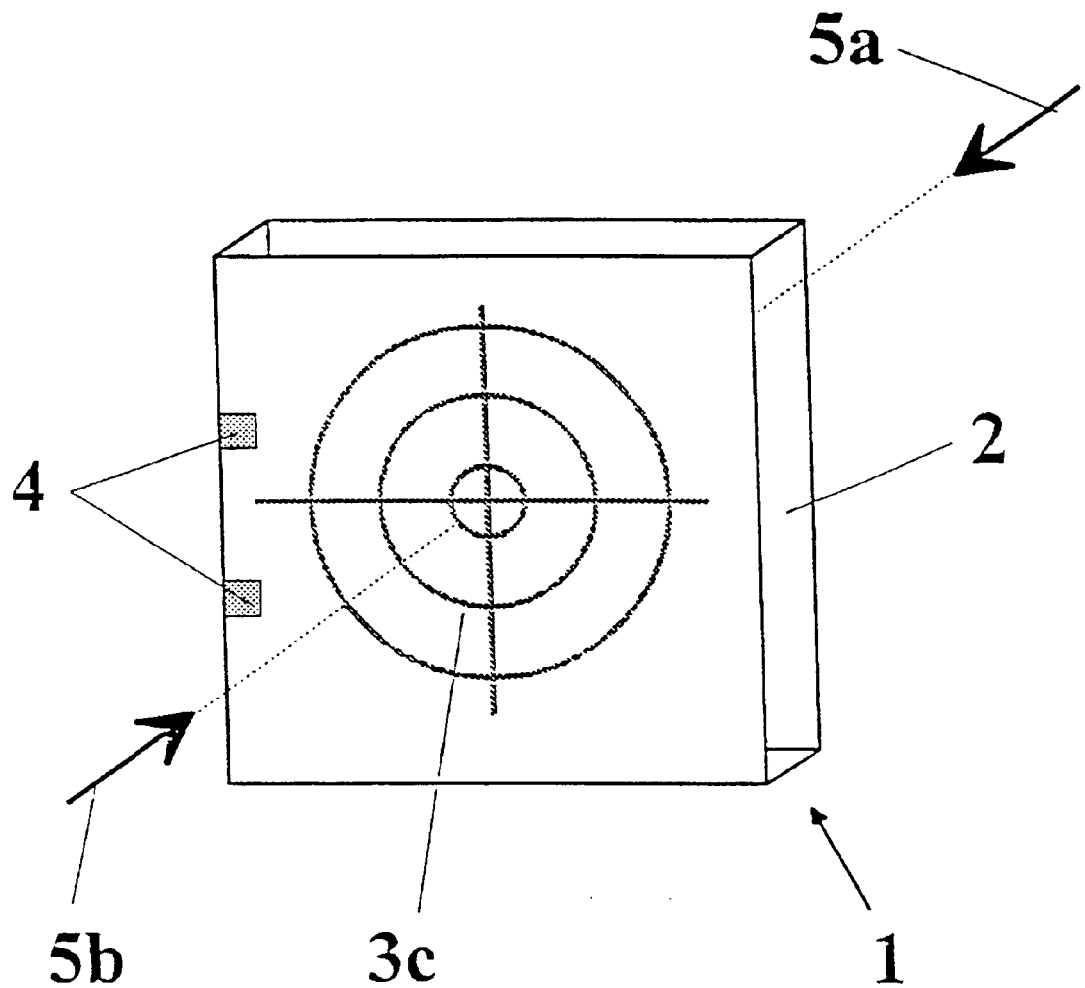

FIG. 3 shows another example of a photoelectric element 3c consisting of concentric circles and crossing strips.

Figure 4:
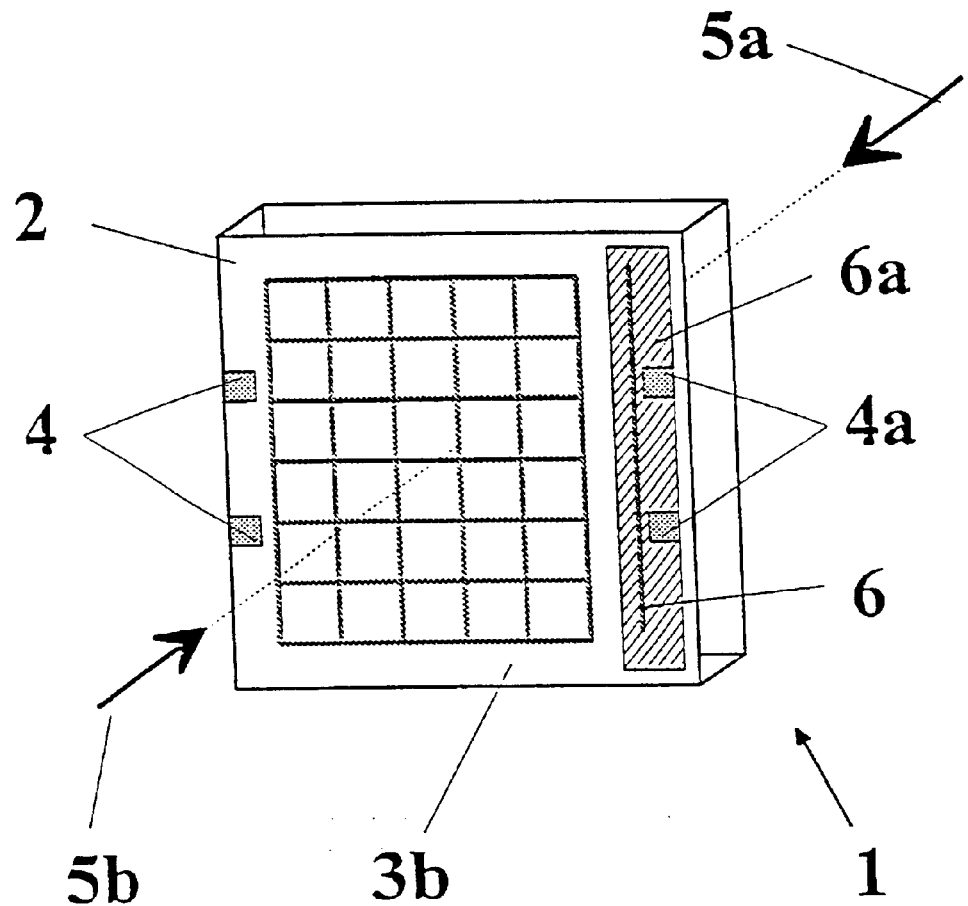

FIG. 4 shows an embodiment having a grid-shaped photoelectric element 3b substantially as shown in FIG. 2, but comprising an additional or auxiliary feature, namely a shielded reference detector, e.g. a photodiode 6. This detector 6, covered by a shield 6a, is not exposed to the light but it is assumed that it has the same temperature as the photoelectric element 3b. Therefore, the reference detector 6 which should have the same temperature characteristics as the element 3b, produces a reference signal which depends from the temperature of the measuring system, and this reference signal may serve for temperature compensation by means of a suitable electronic circuit. Preferably the reference detector 6 is identical in material and characteristics with the photoelectric element 3b in order to enable compensation of the effect of further parameters such as aging, dark current or interdevice variability.

As mentioned above and illustrated by FIGS. 1 to 4, the grid of photoelectric members of the photoelectric element may be uniformly distributed on the surface of support 2. However, the spatial distribution might be adapted to the special distribution of light intensity within the light beam.

While the substrate or support 2 may be made of, e.g., glass without particular optical properties, this substrate may at the same time serve as a wavelength filter or a polarizer. In any case, the photoelectric element would have to be applied to the rear surface opposite the light source in order to measure only polarized or filtered light respectively.

Figure 5:
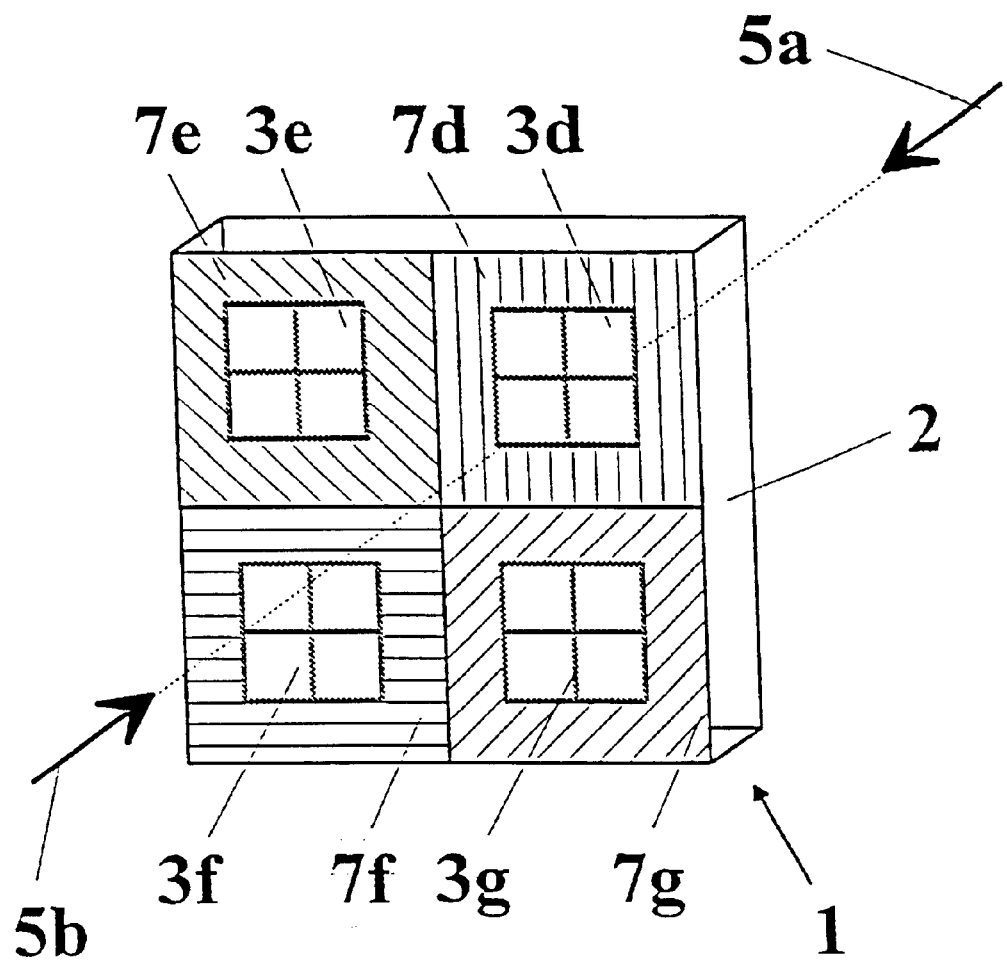

FIG. 5 shows an example of a substrate comprising plates 7d to 7g of a 4-quadrature polarization system. Photoelectric measuring elements 3d–3g are applied to each quadrant.

Generally, the total surface area of the photoelectric element, that is the sum of the surfaces covered by the members of the photoelectric element, should be and may be as small as possible compared with the surface occupied by the array of members of the photoelectric element on a surface of the support or the cross section of the light beam respectively. As an example, the sum of the surfaces covered by the members of the photoelectric element may be in the order of 5 to 30% of the cross section of the light beam, that is, 70 to 95% of the available light would pass through the measuring module 1.

As mentioned above, any suitable substrate 2 and photoelectric element 3a–3g compatible with each other may be used. Besides any well known photoelectric element made of an amorphous or polycristalline semiconductor, novel elements having favorable characteristics, such as an element on polymer basis (known under the designation "Graetzel cell"), an element on CIGS-basis (CIGS means Copper-Indium, Gallium-Diselenide), or manufactured as a photoresistive cell, may be used.

In the embodiments described above with reference to FIGS. 1–5, the direction of the optical axis of a light beam passing through photoelectric measuring module 1 is indicated by arrow 5a or arrow 5b, and is represented as being perpendicular to the plane surface of support 2 on which the light beam impinges. In other embodiments according to the invention the optical axis of the light beam which passes through photoelectric measuring module 1 forms an angle smaller than 90° with the plane surface of support 2 on which the light beam impinges.

As can be appreciated from the above description the above described devices make possible to perform a method for measuring light provided by a light source 8 which comprises the following steps:

(a) positioning a photoelectric element, e.g. one of the above described photoelectric elements 3a to 3g, in the path of the light beam emerging from light source 8, the photoelectric element, comprising an array of spatially distributed photoelectric members which are applied to a surface of an electrically non-conducting support and which are electrically connected with each other, each of the photoelectric members of the array having a surface adapted to receive, but not to transmit light, and the surface of the support comprising areas which allow light transmission, each of the latter areas being located between at least two areas of the support surface which are covered by the photoelectric members, and (b) measuring the intensity of the light beam provided by the light source by means of the photoelectric element.

Figure 6:
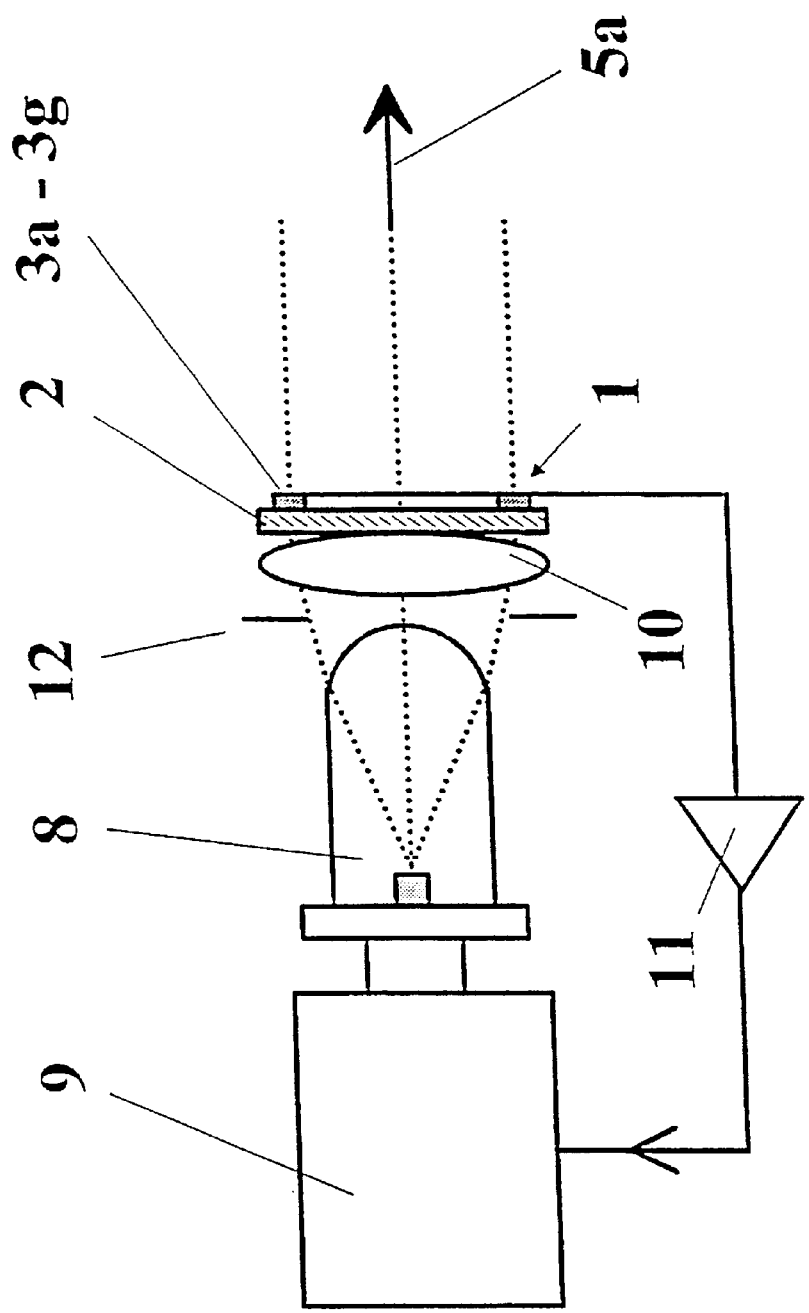
FIG. 6 is a schematic illustration of an example of a first embodiment of a regulated light source according to the invention.

FIG. 6 shows a first preferred embodiment of a device including a measuring module according to FIGS. 1 to 5 in a regulated light source. In the embodiment shown by FIG. 6 substrate 2 is at least partially transparent and a light source 8, preferably a LED, is connected to the output of a driving circuit 9. The light beam emitted by the LED 8 is formed by means of a lens 10 and then passes through the schematically illustrated photoelectric measuring module 1 of which details are explained above. The photoelectric element 3a–3g of photoelectric measuring module 1 is connected to a feedback-loop electronic circuit schematically illustrated by electronic circuit 11. This electronic circuit 11 is connected to the driving circuit 9 for control of the power delivered by the same to the LED 8. In a manner known per se from the prior art, control or monitoring of the driving circuit and of the power delivered to the LED 8 respectively may be chosen in such a way that the light intensity produced and delivered by the LED 8 is regulated to a constant value in spite of the instabilities of the LED mentioned above.

As shown by FIG. 6 light transmitted through photoelectric module 1 emerges in the direction indicated by arrow 5a. Such transmitted light can be used for instance for irradiating a measuring cuvette containing e.g. a sample or a sample-reagent-mixture to be analyzed.

Figure 7:
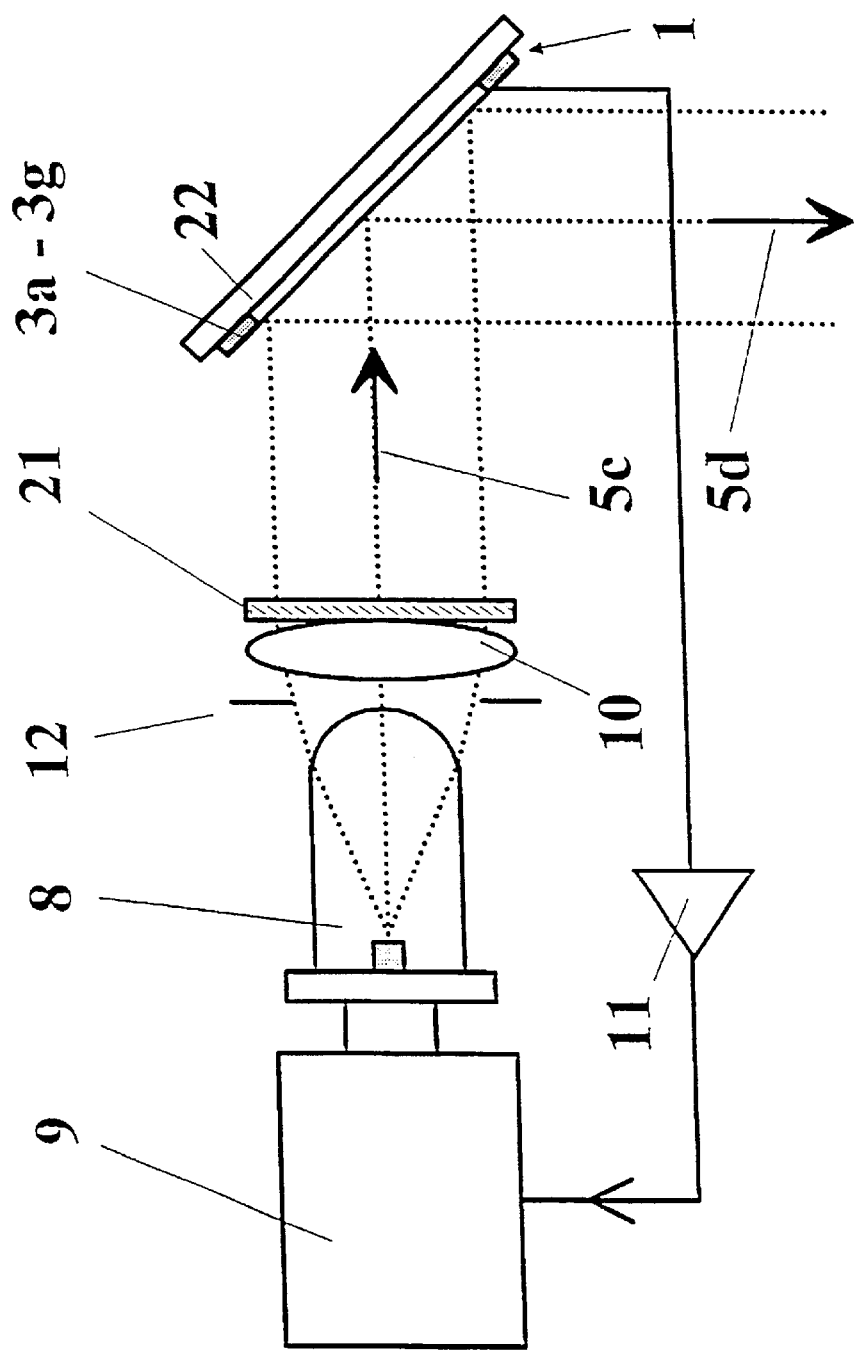
FIG. 7 is a schematic illustration of an example of a second embodiment of a regulated light source according to the invention.

FIG. 7 shows a second preferred embodiment of a device including a measuring module according to FIGS. 1 to 5 in a regulated light source. This second embodiment differs from the first embodiment described with reference to FIG. 6 in the following aspects:

photoelectric module 1 comprises an electrically nonconducting substrate 22 and a photoelectric element 3a–3g mounted on a light reflecting surface of substrate 22, adjacent to lens 10 there is a substrate 21 which may be e.g. a wavelenghth filter or a polarizer, but this substrate has no photoelectric element applied to its surface.

As shown by FIG. 7, the light beam provided by light source 8 passes through lens 10, substrate 21 and is directed towards photoelectric element 3a–3g and the light reflecting surface of substrate 22 in the direction indicated by arrow 5c and is reflected from that surface in the direction indicated by arrow 5d. Such reflected light can be used for instance for irradiating a measuring cuvette containing e.g. a sample or a sample-reagent-mixture to be analyzed.

In the embodiment shown by the FIG. 7 the photoelectric element 3a–3g is connected to a feedback-loop electronic circuit schematically illustrated by electronic circuit 11 as in the embodiment according to FIG. 6.

As can be appreciated from the above description the above described devices make possible to perform a method for regulating a light source (8) which comprises the following steps:

(a) measuring the intensity of the light beam provided by the light source by means of a photoelectric element (3a–3g) located in the path of the light beam emerging from the light source, the photoelectric element comprising an array of spatially distributed photoelectric members which are applied to a surface of an electrically non-conducting support 2 and which are electrically connected with each other, each of the photoelectric members of the array having a surface adapted to receive, but not to transmit light, and the surface of the support (2) comprising areas which allow light transmission, each of the latter areas being located between at least two areas of the support surface which are covered by the photoelectric members, and (b) regulating the intensity of the light beam provided by the light source (8) by means of a driving circuit (9), the regulating step including a feedback of the measuring signal of the photoelectric element to the driving circuit.

In order to properly limit light passage to the area covered by the array of photoelectric members of any photoelectric element 3a–3g, a diaphragm 12 may be provided in front or at the rear of lens 10. The diaphragm may also be applied to the front surface of substrate 2, while any photoelectric element 3a–3g is applied to the rear surface thereof.

The DC signal from the photoelectric element may be used for simple intensity measurement or for analogous closed-loop feedback control. The signal may be transferred into digital information for digital computing or control according to a program or algorithm. More than one photoelectric unit applied to the substrate 2 may also be used for differential measurement.

Stabilized light sources according to this invention may preferably be used with optical measurement systems, for instance in the field of in-vitro diagnosis or in the field of monitoring reactions taking place in reaction vessels.

List of Reference Numbers 1 photoelectric measuring module
2 support, substrate
3a photoelectric element, photoelectric measuring element, photoelectric transducer, photodiode
3b photoelectric element, photoelectric measuring element, photoelectric transducer, photodiode
3c photoelectric element, photoelectric measuring element, photoelectric transducer, photodiode
3d photoelectric element, photoelectric measuring element, photoelectric transducer, photodiode
3e photoelectric element, photoelectric measuring element, photoelectric transducer, photodiode
3f photoelectric element, photoelectric measuring element, photoelectric transducer, photodiode
3g photoelectric element, photoelectric measuring element, photoelectric transducer, photodiode
4 bonding pad
4a bonding pad of 6
5a direction of the optical axis of light beam
5b direction of the optical axis of light beam
5c direction of the optical axis of light beam
5d direction of the optical axis of light beam
6 shielded reference detector, photodiode
6a shield of 6
7d plate of a 4-quadrant polarization system
7e plate of a 4-quadrant polarization system
7f plate of a 4-quadrant polarization system
7g plate of a 4-quadrant polarization system
8 light source, e.g. LED
9 driving circuit
10 lens
11 feedback electronic circuit
12 diaphragm
21 substrate, support
22 substrate, support Although preferred embodiments of the invention have been described using specific terms, such description is for illustrative purposes only, and it is to be understood that changes and variations may be made without departing from the spirit or scope of the following claims.

What is claimed is:

1. A device for measuring a spatially averaged intensity of a light beam, comprising
   (a) an electrically non-conducting support which has a surface, and
   (b) a photoelectric element comprising an array of spatially distributed photoelectric members which are electrically connected with each other,
      said array being applied to that surface of said support,
      said array of photoelectric members being adapted to receive and measure the intensity of a light beam directed towards that surface of said support,
      each of said photoelectric members of said array having a surface adapted to receive, but not to transmit light,
      said surface of said support comprising
         a first set of areas each of which is covered by one of said photoelectric members and which thereby does not allow light transmission, and
         a second set of areas none of which is covered by any one of said photoelectric members and each of which allows light transmission,
         each of the areas of said second set of areas being located between two or more of said areas of said first set of areas.

2. A device according to claim 1, wherein said support is transparent or semitransparent.

3. A device according to claim 1, wherein said support has a light reflecting surface and said array of photoelectric members is applied to said reflecting surface.

4. A device according to claim 1, wherein said array of spatially distributed photoelectric members has two electrical connecting points which are spaced from each other.

5. A device according to claim 1, wherein
   a first part of the surface occupied by said array of photoelectric members on said support surface is covered by the surfaces of the latter members and thereby does not allow light transmission, and
   a second part of the surface occupied by said array of photoelectric members on said support surface is not covered by the surfaces of the latter members and is adapted to allow light transmission.

6. A device according to claim 5, wherein said first part of the surface occupied by said array on said support surface is much smaller than said second part of that surface.

7. A device according to any one of claims 1 to 6, wherein said array of photoelectric members has a grid structure.

8. A device according to any one of claims 1 to 6, wherein said support is a beam-shaping element, a wavelength filter, a polarizer, or a combination thereof.

9. A device according to any one of claims 1 to 6, wherein said array of photoelectric members is made of an amorphous semiconductor, made on polymer basis, made on CIGS-basis, or manufactured as a photoresistive cell.

10. A device according to any one of claims 1 to 6, further comprising a diaphragm applied to said support and serving for limiting the cross section of the light beam which impinges on said photoelectric element to the area occupied by said array of photoelectric members on said support surface.

11. A device according to any one of claims 1 to 6, wherein a density of a spatial distribution of the members of said array of photoelectric members is adapted to a distribution of the light intensity of said light beam.

12. Method for measuring the spatially averaged intensity of a light beam provided by a light source, comprising
   (a) positioning a photoelectric element into the light beam emerging from said light source, said photoelectric element comprising an array of spatially distributed photoelectric members which are applied to a surface of an electrically non-conducting support and which are electrically connected with each other,
      each of said photoelectric members of said array having a surface adapted to receive, but not to transmit light, and said surface of said support comprising areas which allow light transmission, each of the latter areas being located between at least two areas of said support surface which are covered by said photoelectric members, and (b) measuring the intensity of the light beam provided by the light source by means of said photoelectric element.

13. A device for regulating the intensity of a light beam provided by a light source, comprising a photoelectric element by means of which the intensity of the light beam is measured, and a driving circuit for regulating the output power of the light source by feedback of a measuring signal provided by said photoelectric element to said driving circuit, said device being characterized in that said photoelectric element is located in a path of the light beam provided by said light source and said photoelectric element comprises an array of spatially distributed photoelectric members which are applied to a surface of an electrically non-conducting support and which are electrically connected with each other, each of said photoelectric members of said array having a surface adapted to receive, but not to transmit light, and said surface of said support comprising areas which allow light transmission, each of the latter areas being located between at least two areas of said support surface which are covered by said photoelectric members.

14. A device according to claim 13, which further comprises a reference measuring element associated with said photoelectric element and operatively connected with said driving circuit for compensating the temperature characteristics, aging, dark current or interdevice variability of said photoelectric element.

15. A device according to any one of claims 13 or 14, comprising means for regulating said light source to achieve a constant light intensity or in accordance with a determined program.

16. A device according to any one of claims 13 or 14, comprising means for measuring at least one of the parameters temperature, aging, dark current and interdevice variability of said photoelectric element and for providing a measuring signal representative of said parameter and means for controlling said driving circuit by means of said measuring signal for compensating variations of said photoelectric element.

17. Method for regulating a light source, comprising (a) measuring the intensity of a light beam provided by a light source by means of a photoelectric element located in a path of the light beam provided by said light source in order to generate a measuring signal representative of said intensity, said photoelectric element comprising an array of spatially distributed photoelectric members which are applied to a surface of an electrically non-conducting support and which are electrically connected with each other, each of said photoelectric members of said array having a surface adapted to receive, but not to transmit light, and said surface of said support comprising areas which allow light transmission, each of the latter areas being located between at least two areas of said support surface which are covered by said photoelectric members, and (b) regulating the intensity of the light beam provided by the light source by means of a driving circuit, said regulating step including a feedback of said measuring signal provided by said photoelectric element to said driving circuit.

\* \* \* \* \*